(12) United States Patent
Yokoyama et al.

(10) Patent No.: US 10,710,409 B2
(45) Date of Patent: Jul. 14, 2020

(54) CAP TREAD RUBBER COMPOSITION AND PNEUMATIC TIRE

(71) Applicant: SUMITOMO RUBBER INDUSTRIES, LTD., Kobe-shi, Hyogo (JP)

(72) Inventors: Yuka Yokoyama, Kobe (JP); Suguru Izumo, Kobe (JP)

(73) Assignee: SUMITOMO RUBBER INDUSTRIES, LTD., Kobe-shi, Hyogo (JP)

(*) Notice: Subject to any disclaimer, the term of this patent is extended or adjusted under 35 U.S.C. 154(b) by 381 days.

(21) Appl. No.: 15/868,371

(22) Filed: Jan. 11, 2018

(65) Prior Publication Data

US 2018/0236815 A1 Aug. 23, 2018

(30) Foreign Application Priority Data

Feb. 20, 2017 (JP) ................. 2017-029061

(51) Int. Cl.

| | |
|---|---|
| *B60C 1/00* | (2006.01) |
| *B60C 11/00* | (2006.01) |
| *C08C 19/22* | (2006.01) |
| *C08C 19/25* | (2006.01) |
| *C08C 19/34* | (2006.01) |
| *C09K 3/22* | (2006.01) |
| *C08K 3/36* | (2006.01) |
| *C08K 5/00* | (2006.01) |
| *C08L 15/00* | (2006.01) |
| *C08L 57/02* | (2006.01) |
| *C08L 7/00* | (2006.01) |
| *C08L 9/00* | (2006.01) |
| *C08L 9/06* | (2006.01) |

(52) U.S. Cl.
CPC .............. *B60C 1/0016* (2013.01); *B60C 1/00* (2013.01); *B60C 11/005* (2013.01); *C08C 19/22* (2013.01); *C08C 19/25* (2013.01); *C08C 19/34* (2013.01); *C08K 3/36* (2013.01); *C08K 5/00* (2013.01); *C08L 7/00* (2013.01); *C08L 9/00* (2013.01); *C08L 9/06* (2013.01); *C08L 15/00* (2013.01); *B60C 2001/0083* (2013.01); *C08L 2205/02* (2013.01); *C08L 2205/03* (2013.01)

(58) Field of Classification Search
CPC ......... C09D 5/185; C09D 167/00; D01F 1/10; D06M 15/17; D06M 15/41; D06M 15/273; D06M 2200/30; C08G 63/133; C08G 63/81; C08G 63/79; C08G 63/668; C09K 21/14; C08L 77/06; C08L 2201/02; C08L 77/02
See application file for complete search history.

(56) References Cited

U.S. PATENT DOCUMENTS

2014/0155519 A1  6/2014 Ringot
2017/0361658 A1* 12/2017 Sanders ............... B60C 1/0016

FOREIGN PATENT DOCUMENTS

| EP | 2716700 A1 * | 4/2014 | ............ C08L 15/00 |
|---|---|---|---|
| JP | 10-273560 A | 10/1998 | |
| JP | 2001-214003 A | 8/2001 | |
| JP | 2005-281621 A | 10/2005 | |
| JP | 2006-77097 A | 3/2006 | |
| JP | 2008-297445 A | 12/2008 | |
| JP | 2014-95018 A | 5/2014 | |
| JP | 2014-518913 A | 8/2014 | |
| JP | 2014-198812 A | 10/2014 | |
| JP | 2016-3254 A | 1/2016 | |
| JP | 2016-30816 A | 3/2016 | |
| JP | 2016-166297 A | 9/2016 | |
| JP | 2016-216535 A | 12/2016 | |
| JP | 6253822 B1 | 12/2017 | |

* cited by examiner

*Primary Examiner* — Andrew J. Oyer
(74) *Attorney, Agent, or Firm* — Birch, Stewart, Kolasch & Birch, LLP

(57) ABSTRACT

The present invention provides a cap tread rubber composition and a pneumatic tire formed from the rubber composition which are excellent in grip performance and abrasion resistance during high speed running. Provided is a cap tread rubber composition, containing: styrene butadiene rubber and/or polybutadiene rubber; an isoprene-based rubber; a filler; and a plasticizer, the rubber composition containing, based on 100% by mass of a rubber component therein, at least 90% by mass in total of the styrene butadiene rubber and/or polybutadiene rubber and 0.3% to 10% by mass of the isoprene-based rubber, the filler including, based on 100% by mass thereof, at least 80% by mass of silica, the rubber composition containing, per 100 parts by mass of the rubber component, at least 110 parts by mass of the silica and at least 50 parts by mass of the plasticizer.

8 Claims, No Drawings

CAP TREAD RUBBER COMPOSITION AND PNEUMATIC TIRE

TECHNICAL FIELD

The present invention relates to a cap tread rubber composition and a pneumatic tire.

BACKGROUND ART

These days, automobile tires particularly require grip performance and abrasion resistance. Therefore, techniques using modified SBR and specific silica, for example, have been proposed.

Other proposed techniques include techniques that incorporate a large amount of plasticizers such as resins to enhance grip performance; and techniques that incorporate a large amount of fillers such as silica to enhance abrasion resistance. However, silica is difficult to disperse in such compounded systems, and unfortunately the abrasion resistance cannot be enhanced to a desired level.

Moreover, high-speed grip performance and abrasion resistance in various temperature ranges are required during running at high speeds on highways (e.g. the autobahn in Europe). However, no satisfactory technique has been developed, and there is a need for rubber compositions excellent in grip performance and abrasion resistance during high speed running.

SUMMARY OF INVENTION

Technical Problem

The present invention aims to solve the problems and provide a cap tread rubber composition and a pneumatic tire formed from the rubber composition which are excellent in grip performance and abrasion resistance during high speed running.

Solution to Problem

The present invention relates to a cap tread rubber composition, containing: at least one of styrene butadiene rubber or polybutadiene rubber; an isoprene-based rubber; a filler; and a plasticizer, the rubber composition containing, based on 100% by mass of a rubber component therein, at least 90% by mass in total of the at least one of styrene butadiene rubber or polybutadiene rubber and 0.3% to 10% by mass of the isoprene-based rubber, the filler including, based on 100% by mass thereof, at least 80% by mass of silica, the rubber composition containing, per 100 parts by mass of the rubber component, at least 110 parts by mass of the silica and at least 50 parts by mass of the plasticizer.

The styrene butadiene rubber preferably has a vinyl content of 70 mol % or less.

The styrene butadiene rubber is preferably a modified styrene butadiene rubber containing a functional group interactive with silica.

The styrene butadiene rubber is preferably present in an amount of 80% by mass or more based on 100% by mass of the rubber component.

The plasticizer preferably includes, based on 100% by mass thereof, not more than 20% by mass of a liquid plasticizer.

The rubber composition preferably contains a silica having a nitrogen adsorption specific surface area of 190 m$^2$/g or more in an amount of 50 parts by mass or more per 100 parts by mass of the rubber component.

The present invention also relates to a pneumatic tire, including: a cap tread formed from the rubber composition; and a base tread.

The base tread is preferably formed from a base tread rubber composition containing, based on 100% by mass of a rubber component therein, at least 20% by mass of an isoprene-based rubber.

Advantageous Effects of Invention

The cap tread rubber composition of the present invention contains: styrene butadiene rubber and/or polybutadiene rubber; an isoprene-based rubber; a filler; and a plasticizer. The rubber component of the rubber composition has a predetermined combined content of styrene butadiene rubber and polybutadiene rubber and a predetermined isoprene-based rubber content. The filler has a predetermined silica content. Further, the silica and the plasticizer are present in predetermined amounts relative to the rubber component. Such a cap tread rubber composition can significantly improve grip performance and abrasion resistance during high speed running.

DESCRIPTION OF EMBODIMENTS

[Cap Tread]

The cap tread rubber composition of the present invention contains: styrene butadiene rubber and/or polybutadiene rubber; an isoprene-based rubber; a filler; and a plasticizer. The rubber component of the rubber composition has a predetermined combined content of styrene butadiene rubber and polybutadiene rubber and a predetermined isoprene-based rubber content. The filler has a predetermined silica content. Further, the silica and the plasticizer are present in predetermined amounts relative to the rubber component. By satisfying all the requirements, it is possible to achieve a balanced improvement of grip performance (on low temperature and high temperature roads) and abrasion resistance during high speed running, which has conventionally been difficult to achieve. Furthermore, good wet grip performance can be obtained as well.

In the present invention, a small amount of an isoprene-based rubber as a rubber component is added to a compound containing predetermined amounts of a rubber component with a high SBR and/or BR content, a filler with a high silica content, and a plasticizer to form fine islands incompatible with the other rubber component, thereby resulting in enhanced dispersibility of silica. Here, it is expected that if an incompatible rubber component is contained in a rubber matrix, a lot of silica can be left at the interface, and the cross-linked form can change at the interface. However, because of the presence of fine non-uniform regions formed by incorporating a small amount of an isoprene-based rubber, it is considered that the dispersibility of silica is increased so that grip performance on both low temperature and high temperature roads and abrasion resistance can be significantly improved during high speed running.

In the cap tread rubber composition, the combined content (combined amount) of SBR and BR based on 100% by mass of the rubber component is 90% by mass or more, preferably 92% by mass or more, more preferably 93% by mass or more, in order to obtain sufficient grip performance (on low temperature and high temperature roads).

The SBR content (amount) based on 100% by mass of the rubber component is preferably 40% by mass or more, more preferably 60% by mass or more, still more preferably 70% by mass or more, particularly preferably 80% by mass or more, in order to obtain sufficient grip performance (on low temperature and high temperature roads). In view of abrasion resistance, the SBR content is preferably 98% by mass or less, more preferably 97% by mass or less.

The BR content (amount) based on 100% by mass of the rubber component is preferably 0 to 60% by mass, more preferably 0 to 50% by mass, still more preferably 10 to 30% by mass, in order to obtain sufficient grip performance (on low temperature and high temperature roads) and in view of the balance with fuel economy.

Non-limiting examples of usable SBR include emulsion-polymerized styrene butadiene rubber (E-SBR) and solution-polymerized styrene butadiene rubber (S-SBR). The SBR may be unmodified SBR or a modified SBR. In particular, it is preferably a modified SBR containing a functional group interactive with silica (silica-interactive functional group). Such an SBR enhances grip performance (on low temperature and high temperature roads) and abrasion resistance. The functional group may be located in the main chain or at a terminal.

The silica-interactive functional group may be any group that is interactive (reactive) with silica. Examples include an amino group, an amide group, a silyl group, an alkoxysilyl group, an isocyanate group, an imino group, an imidazole group, an urea group, an ether group, a carbonyl group, an oxycarbonyl group, a mercapto group, a sulfide group, a disulfide group, a sulfonyl group, a sulfinyl group, a thiocarbonyl group, an ammonium group, an imide group, a hydrazo group, an azo group, a diazo group, a carboxyl group, a nitrile group, a pyridyl group, an alkoxy group, a hydroxy group, an oxy group, and an epoxy group, which may be substituted. In view of grip performance (on low temperature and high temperature roads) and abrasion resistance, an amino group (preferably in which a hydrogen atom is replaced by a C1-C6 alkyl group), an alkoxy group (preferably a C1-C6 alkoxy group), and an alkoxysilyl group (preferably a C1-C6 alkoxysilyl group) are preferred among these.

The modified SBR is preferably a styrene butadiene rubber modified with a compound (modifier) represented by the formula (1) below, particularly suitably an S-SBR in which a polymerizing end (active end) is modified with the compound of formula (1):

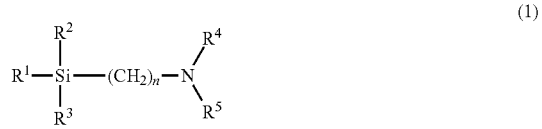

(1)

wherein $R^1$, $R^2$, and $R^3$ are the same or different and each represent an alkyl, alkoxy, silyloxy, acetal, carboxyl (—COOH), or mercapto (—SH) group or a derivative thereof; $R^4$ and $R^5$ are the same or different and each represent a hydrogen atom or an alkyl group, and $R^4$ and $R^5$ may be joined together to form a ring structure with the nitrogen atom; and n represents an integer.

In formula (1), $R^1$, $R^2$, and $R^3$ may each suitably be an alkoxy group, preferably a C1-C8, more preferably C1-C4 alkoxy group; $R^4$ and $R^5$ may each suitably be an alkyl group, preferably a C1-C3 alkyl group; and n is preferably 1 to 5, more preferably 2 to 4, still more preferably 3. In the case where $R^4$ and $R^5$ are joined together to form a ring structure with the nitrogen atom, the ring structure is preferably a 4- to 8-membered ring. The term "alkoxy group" encompasses cycloalkoxy groups (e.g. cyclohexyloxy group) and aryloxy groups (e.g. phenoxy and benzyloxy groups).

Specific examples of the compound of formula (1) include 2-dimethylaminoethyltrimethoxysilane, 3-dimethylaminopropyltrimethoxysilane, 2-dimethylaminoethyltriethoxysilane, 3-dimethylaminopropyltriethoxysilane, 2-diethylaminoethyltrimethoxysilane, 3-diethylaminopropyltrimethoxysilane, 2-diethylaminoethyltriethoxysilane, and 3-diethylaminopropyltriethoxysilane. In view of grip performance (on low temperature and high temperature roads) and abrasion resistance, 3-dimethylaminopropyltrimethoxysilane, 3-dimethylaminopropyltriethoxysilane, 3-diethylaminopropyltrimethoxysilane, and 3-diethylaminopropyltriethoxysilane are preferred among these. These compounds may be used alone, or two or more of these may be used in combination.

The SBR preferably has a styrene content of 10% by mass or more, more preferably 15% by mass or more, still more preferably 20% by mass or more. A styrene content equal to or more than the lower limit tends to lead to sufficient grip performance (on low temperature and high temperature roads). The styrene content is also preferably 55% by mass or less, more preferably 45% by mass or less, still more preferably 43% by mass or less. A styrene content equal to or less than the upper limit tends to ensure good fuel economy. Herein, the styrene content can be measured as described later in EXAMPLES.

The SBR preferably has a vinyl content of 70 mol % or less, more preferably 65 mol % or less, still more preferably 60 mol % or less. A vinyl content equal to or less than the upper limit tends to ensure good fuel economy. The vinyl content is also preferably 5 mol % or more, more preferably 8 mol % or more, still more preferably 10 mol % or more. A vinyl content equal to or more than the lower limit tends to lead to sufficient grip performance (on low temperature and high temperature roads). Herein, the vinyl content refers to the vinyl content (vinyl bond content) in the butadiene moiety and can be measured as described later in EXAMPLES.

Non-limiting examples of the BR include high cis BR such as BR730 and BR51 both available from JSR Corporation, BR1220 available from Zeon Corporation, and BR130B, BR150B, and BR710 all available from Ube Industries, Ltd., and low cis BR such as BR1250H available from Zeon Corporation. These types of BR may be used alone, or two or more of these may be used in combination.

The BR preferably has a cis content of 80% by mass or more, more preferably 85% by mass or more, still more preferably 90% by mass or more, particularly preferably 95% by mass or more. In this case, good performance on ice and snow can be obtained as well as grip performance and abrasion resistance.

Herein, the cis content is determined by an infrared absorption spectrum analysis.

In the cap tread rubber composition, in view of grip performance (on low temperature and high temperature roads), the isoprene-based rubber content (amount) based on 100% by mass of the rubber component is 0.3% to 10% by mass, preferably 1.0% to 10% by mass, more preferably 2.0% to 10% by mass. As described earlier, the incorporation of a small amount of an isoprene-based rubber results in the formation of fine non-uniform regions, thereby enhancing grip performance (on low temperature and high temperature roads) and abrasion resistance.

Examples of isoprene-based rubbers that can be used include synthetic polyisoprene rubber (IR), natural rubber (NR), and modified natural rubber. The NR encompasses deproteinized natural rubber (DPNR) and highly purified natural rubber (HPNR). Examples of the modified natural rubber include epoxidized natural rubber (ENR), hydrogenated natural rubber (HNR), and grafted natural rubber. Examples of the NR include those commonly used in the tire industry, such as SIR20, RSS #43, and TSR20. For sufficient grip performance (on low temperature and high temperature roads), NR or IR is preferred among these, with NR being more preferred.

The rubber component may include other rubbers. Examples include styrene-isoprene-butadiene rubber (SIBR), ethylene-propylene-diene rubber (EPDM), chloroprene rubber (CR), acrylonitrile butadiene rubber (NBR), and butyl-based rubbers.

The cap tread rubber composition contains silica in a filler. When the silica is uniformly dispersed, good grip performance (on low temperature and high temperature roads and wet roads) and good abrasion resistance can be imparted. Examples of the silica include dry silica (anhydrous silica) and wet silica (hydrous silica). Among these, wet silica is preferred as it contains a large number of silanol groups. One type of silica may be used alone, or two or more types may be used in combination.

The silica content (amount) based on 100% by mass of the filler is 80% by mass or more. With the filler having a high silica content, good grip performance (on low temperature and high temperature roads and wet roads) and good abrasion resistance can be obtained, and the balance with fuel economy can also be improved. The silica content is preferably 85% by mass or more, more preferably 90% by mass or more. The upper limit of the silica content is not particularly critical, and may be 100% by mass or may be equal to or less than 99% by mass.

In the cap tread rubber composition, the amount of silica per 100 parts by mass of the rubber component is preferably 110 parts by mass or more, more preferably 120 parts by mass or more, still more preferably 125 parts by mass or more. An amount equal to or more than the lower limit tends to lead to sufficient grip performance (on low temperature and high temperature roads and wet roads) and abrasion resistance. The upper limit of the amount is not particularly critical. In view of processability and fuel economy, it is preferably 300 parts by mass or less, more preferably 250 parts by mass or less, still more preferably 200 parts by mass or less.

The silica may suitably be a fine particle silica having a nitrogen adsorption specific surface area ($N_2SA$) of 190 $m^2/g$ or more. Such a silica significantly enhances abrasion resistance, thereby greatly improving the performance balance with grip performance.

In view of abrasion resistance, the amount of the fine particle silica per 100 parts by mass of the rubber component is preferably 50 parts by mass or more, more preferably 80 parts by mass or more. The upper limit of the amount is not particularly critical. In view of processability and fuel economy, it is preferably 300 parts by mass or less, more preferably 250 parts by mass or less, still more preferably 200 parts by mass or less.

The fine particle silica preferably has a $N_2SA$ of 200 $m^2/g$ or more, more preferably 210 $m^2/g$ or more. In order to significantly enhance abrasion resistance, the $N_2SA$ may desirably be more than 210 $m^2/g$. The upper limit of the $N_2SA$ of the silica is not particularly critical. In view of workability and processability, it is preferably 400 $m^2/g$ or less. The nitrogen adsorption specific surface area of silica is determined by the BET method in accordance with ASTM D3037-81.

In view of abrasion resistance and performance on ice and snow, the fine particle silica preferably has a cetyltrimethylammonium bromide (CTAB) specific surface area of 150 $m^2/g$ or more, more preferably 180 $m^2/g$ or more, still more preferably 190 $m^2/g$ or more. The upper limit of the CTAB specific surface area is not particularly critical. In view of workability and processability, it is preferably 400 $m^2/g$ or less. The CTAB specific surface area is determined in accordance with ASTM D3765-92.

In the case of the cap tread rubber composition containing silica, it preferably contains a silane coupling agent together with silica.

Any silane coupling agent conventionally used together with silica in the rubber industry may be used. Examples include sulfide silane coupling agents such as bis(3-triethoxysilylpropyl)disulfide and bis(3-triethoxysilylpropyl)tetrasulfide; mercapto silane coupling agents such as 3-mercaptopropyltrimethoxysilane; vinyl silane coupling agents such as vinyltriethoxysilane; amino silane coupling agents such as 3-aminopropyltriethoxysilane; glycidoxy silane coupling agents such as γ-glycidoxypropyltriethoxysilane; nitro silane coupling agents such as 3-nitropropyltrimethoxysilane; and chloro silane coupling agents such as 3-chloropropyltrimethoxysilane. Among these, sulfide silane coupling agents are preferred, with bis(3-triethoxysilylpropyl) disulfide or bis(3-triethoxysilylpropyl)tetrasulfide being more preferred.

The amount of the silane coupling agent per 100 parts by mass of silica is preferably 1 part by mass or more, more preferably 3 parts by mass or more. An amount equal to or more than the lower limit tends to lead to sufficient grip performance. The amount of the silane coupling agent is also preferably 15 parts by mass or less, more preferably 10 parts by mass or less. An amount equal to or less than the upper limit tends to lead to an effect commensurate with the incorporated amount.

In view of weatherability, grip performance (on low temperature and high temperature roads), and abrasion resistance, the cap tread rubber composition preferably contains carbon black. Any carbon black may be used including those commonly used in the tire industry, such as GPF, FEF, HAF, ISAF, and SAF. These types of carbon black may be used alone, or two or more of these may be used in combination.

In order to obtain good weatherability, grip performance (on low temperature and high temperature roads), and abrasion resistance, the amount of carbon black per 100 parts by mass of the rubber component is preferably 1 part by mass or more, more preferably 3 parts by mass or more. In view of fuel economy and processability, the amount of carbon black is preferably 30 parts by mass or less, more preferably 10 parts by mass or less.

In order to obtain good grip performance (on low temperature and high temperature roads) and good abrasion resistance, the carbon black preferably has a nitrogen adsorption specific surface area ($N_2SA$) of 80 $m^2/g$ or more, more preferably 100 $m^2/g$ or more. In view of processability, the $N_2SA$ of the carbon black is preferably 200 $m^2/g$ or less, more preferably 150 $m^2/g$ or less. The nitrogen adsorption specific surface area of carbon black is measured by the A method in JIS K6217.

The cap tread rubber composition contains a plasticizer. This provides good grip performance (on low temperature and high temperature roads), thereby significantly improving the performance balance with abrasion resistance.

Herein, the term "plasticizer" refers to a material that imparts plasticity to a rubber component, and examples include liquid plasticizers such as fats and oils (e.g. process oils, extender oils, plant oils, animal fats and oils), synthetic liquid ester plasticizers, liquid polymers, and liquid resins; waxes; and solid resins. More specifically, the plasticizer is a component that can be extracted from a rubber composition using acetone.

In the cap tread rubber composition, in view of processability, the amount of the plasticizer per 100 parts by mass of the rubber component is 50 parts by mass or more, preferably 60 parts by mass or more, more preferably 65 parts by mass or more. The upper limit of the amount is not particularly critical. In order to obtain good abrasion resistance and good fracture resistance, it is preferably 200 parts by mass or less, more preferably 150 parts by mass or less, still more preferably 100 parts by mass or less.

Examples of the oils include petroleum oils such as, specifically, paraffinic process oils, naphthenic process oils, and aromatic process oils, as well as aromatic oil alternatives such as treated distillate aromatic extracts (TDAE) and solvent residue aromatic extracts (SRAE), and mild extraction solvates (MES). Among these, TDAE is preferred.

In view of grip performance (on low temperature and high temperature roads) and abrasion resistance, the liquid plasticizer content (amount) based on 100% by mass of the plasticizer is preferably 30% by mass or less, more preferably 20% by mass or less, still more preferably 18% by mass or less. The lower limit of the content is not particularly critical and may be 0% by mass, but is preferably 1% by mass or more, more preferably 3% by mass or more.

The term "liquid plasticizer" refers to a plasticizer that is liquid at 25° C.

Examples of the solid resins and the liquid resins include styrene-based resins, petroleum resins and/or coal resins (e.g. C5, C9, and 05/C9 resins), indene resin, coumarone-indene resin, terpene-based resins, and natural resins.

Examples of C5 resins include aliphatic petroleum resins made mainly from olefins or diolefins in C5 fraction obtained by naphtha cracking. Examples of C9 resins include aromatic petroleum resins made mainly from vinyltoluene, indene, or methylindene in C9 fraction obtained by naphtha cracking.

In view of grip performance, the C5, C9, or C5/C9 resin preferably has a softening point of 0° C. or higher, more preferably 20° C. or higher, still more preferably 50° C. or higher, particularly preferably 80° C. or higher. The softening point is also preferably 150° C. or lower, more preferably 130° C. or lower.

In view of grip performance (on low temperature and high temperature roads) and abrasion resistance, the amount of the solid resin or liquid resin per 100 parts by mass of the rubber component is preferably 20 parts by mass or more, more preferably 40 parts by mass or more, still more preferably 50 parts by mass or more, particularly preferably 60 parts by mass or more. The upper limit of the amount is not particularly critical, but is preferably 200 parts by mass or less, more preferably 150 parts by mass or less, still more preferably 100 parts by mass or less.

The terms "solid resin" and "liquid resin" refer to resins that are solid and liquid, respectively, at 25° C.

The cap tread rubber composition usually contains a vulcanizing agent and a vulcanization accelerator. Any vulcanizing agent or vulcanization accelerator commonly used in the tire industry may be used.

The vulcanizing agent is preferably sulfur, more preferably powdered sulfur, or may be a combination of sulfur and an additional vulcanizing agent. Examples of the additional vulcanizing agent include sulfur-containing vulcanizing agents such as Tackirol V200 available from Taoka Chemical Co., Ltd., DURALINK HTS (hexamethylene-1,6-bis (thiosulfate), disodium salt, dehydrate) available from Flexsys, and KA9188 (1,6-bis(N,N-dibenzylthiocarbamoyldithio)hexane) available from Lanxess, and organic peroxides such as dicumyl peroxide.

The amount of the vulcanizing agent per 100 parts by mass of the rubber component is preferably 0.1 parts by mass or more, more preferably 0.5 parts by mass or more, but is preferably 15 parts by mass or less, more preferably 5 parts by mass or less.

Preferred examples of the vulcanization accelerator include guanidine, sulfenamide, thiazole, thiuram, dithiocarbamate, thiourea, and xanthate vulcanization accelerators. Although these vulcanization accelerators may be used alone, it is desirable to combine two or more of them according to the intended use. In particular, it is preferred to use at least a guanidine vulcanization accelerator.

Examples of the guanidine vulcanization accelerator include 1,3-diphenylguanidine, 1,3-di-o-tolylguanidine, 1-o-tolylbiguanide, di-o-tolylguanidine salt of dicatechol borate, 1,3-di-o-cumenylguanidine, 1,3-di-o-biphenylguanidine, and 1,3-di-o-cumenyl-2-propionylguanidine. Among these, 1,3-diphenylguanidine, 1,3-di-o-tolylguanidine, and 1-o-tolylbiguanide are particularly preferred because of their high reactivity.

The amount of the vulcanization accelerator per 100 parts by mass of the rubber component is preferably 0.1 to 10 parts by mass, more preferably 0.2 to 7 parts by mass.

In addition to the above-described materials, the cap tread rubber composition may appropriately contain various materials commonly used in the tire industry, such as antioxidants, surfactants, zinc oxide, stearic acid, and waxes.

The cap tread rubber composition can be prepared by known methods. For example, it may be prepared by kneading the components in a rubber kneading machine such as an open roll mill or Banbury mixer and vulcanizing the kneaded mixture.

[Base Tread]

A cap tread formed from the cap tread rubber composition can be used with a base tread to produce a pneumatic tire including a tread with a multi-layered structure. The base tread may be formed from a conventionally known rubber composition (base tread rubber composition) that contains predetermined rubber component, filler, and other components. The base tread rubber composition preferably contains an isoprene-based rubber to reduce the difference in rubber properties between the cap and base parts of the tread, thereby achieving better fracture resistance and reduced noise.

In the base tread rubber composition, in view of handling stability, processability, and other properties, the isoprene-based rubber content (amount) based on 100% by mass of the rubber component is preferably 20% by mass or more, more preferably 30% by mass or more, still more preferably 40% by mass or more. The upper limit of the content is not particularly critical. Examples of isoprene-based rubbers that can be used are as mentioned above.

[Pneumatic Tire]

The pneumatic tire including the cap tread rubber composition and the base tread rubber composition can be formed from these rubber compositions by usual methods. Specifically, the unvulcanized cap tread and base tread rubber compositions which contain additives as needed are extruded and processed into the shapes of the corresponding tire components and assembled with other tire components on a tire building machine in a usual manner to build an unvulcanized tire. The unvulcanized tire is heated and pressurized in a vulcanizer to produce a tire.

The pneumatic tire of the present invention is suitable as a cold weather tire and may be used as a tire for passenger vehicles, trucks and buses, two-wheeled vehicles, or other vehicles, or as a high performance tire.

EXAMPLES

The present invention is specifically described with reference to examples, but is not limited thereto.

The chemicals used in examples and comparative examples are listed below.

NR: TSR
BR: High cis BR (cis content: 96% by mass)
Modified SBR: see Production Example 1
Silica 1: $N_2SA$ 240 $m^2/g$, CTAB 200 $m^2/g$
Silica 2: $N_2SA$ 200 $m^2/g$, CTAB 155 $m^2/g$
Silica 3: $N_2SA$ 175 $m^2/g$, CTAB 175 $m^2/g$
Silane coupling agent: bis(3-triethoxysilylpropyl)-tetrasulfide
Carbon black: $N_2SA$ 114 $m^2/g$
Oil: TDAE oil
Resin: C5/C9 resin (softening point 86° C.)
Stearic acid: a commercial product
Antioxidant: N-(1,3-dimethylbutyl)-N'-phenyl-p-phenylenediamine
Zinc oxide: Zinc oxide #2
Sulfur: powdered sulfur
Vulcanization accelerator 1: N,N'-diphenylguanidine
Vulcanization accelerator 2: N-cyclohexyl-2-benzothiazolylsulfenamide Production Example 1: Synthesis of Modified SBR The inside of a stainless steel polymerization reactor having an internal volume of 20 L was cleaned, dried, and purged with dry nitrogen. Then, 10.2 kg of hexane (specific gravity: 0.68 g/cm³), 547 g of 1,3-butadiene, 173 g of styrene, and 6.1 mL of tetrahydrofuran were introduced into the polymerization reactor. Subsequently, a solution of n-butyllithium (13.1 mmol) in n-hexane was introduced to start polymerization.

The copolymerization of 1,3-butadiene with styrene was performed for three hours with stirring at a rate of 130 rpm and a temperature inside the polymerization reactor of 70° C. while continuously feeding the monomers into the polymerization reactor. The total amounts of 1,3-butadiene and styrene fed during the polymerization were 821 g and 259 g, respectively. Next, the polymer solution was stirred at a rate of 130 rpm, followed by addition of 11.1 mmol of 3-diethylaminopropyltriethoxysilane and then stirring for 15 minutes. To the polymer solution was added 20 mL of a hexane solution containing 0.54 mL of methanol, followed by stirring the polymer solution for five minutes.

To the resulting polymer solution were added 1.8 g of 2-tert-butyl-6-(3-tert-butyl-2-hydroxy-5-methylbenzyl)-4-methylphenyl acrylate and 0.9 g of pentaerythrityltetrakis (3-laurylthiopropionate), followed by steam stripping to collect a modified SBR from the polymer solution.

The modified SBR had a styrene content of 25% by mass, a vinyl content of 28 mol %, a Mw/Mn of 1.1, and a Mw of 600,000.

The molecular weight, styrene content, and vinyl content of the thus prepared polymer were analyzed as described below.
<Molecular Weight>

The weight average molecular weight (Mw) and number average molecular weight (Mn) were measured by gel permeation chromatography (GPC) under the following conditions (1) to (8). The molecular weight distribution (Mw/Mn) of the polymer was determined from the Mw and Mn.

(1) Apparatus: HLC-8020 available from Tosoh Corporation
(2) Separation column: GMH-XL (two in series) available from Tosoh Corporation
(3) Measurement temperature: 40° C.
(4) Carrier: tetrahydrofuran
(5) Flow rate: 0.6 mL/min
(6) Injection volume: 5 μL
(7) Detector: differential refractometer
(8) Molecular weight standards: polystyrene standards
<Vinyl Content (in Mol %)>

The vinyl bond content of the polymer was determined by infrared spectroscopy from the intensity of the absorption around 910 $cm^{-1}$ corresponding to the absorption peak for the vinyl group.
<Styrene Content (in % by Mass)>

The styrene unit content of the polymer was determined from the refractive index in accordance with JIS K6383 (1995).

[Method of Preparing Cap Tread Rubber Composition]

According to each of the formulations indicated in Table 1, the materials listed in the base kneading section were kneaded in a 1.7 L Banbury mixer (Kobe Steel, Ltd.) at 150° C. for five minutes to give a kneaded mixture. Next, the chemicals listed in the final kneading section were added to the kneaded mixture, followed by kneading in an open roll mill at 80° C. for five minutes to obtain an unvulcanized rubber composition.

[Method of Preparing Base Tread Rubber Composition]

According to the formulation indicated in Table 2, the materials other than the sulfur and vulcanization accelerator were kneaded in a 1.7 L Banbury mixer (Kobe Steel, Ltd.) at 150° C. for five minutes to give a kneaded mixture. Next, the sulfur and vulcanization accelerator were added to the kneaded mixture, followed by kneading in an open roll mill at 80° C. for five minutes to obtain an unvulcanized rubber composition.

[Method of Preparing Test Tire]

According to Tables 1 and 2, the unvulcanized cap tread rubber composition and the unvulcanized base tread rubber composition were formed into the shapes of a cap tread and a base tread, respectively, and then assembled with other tire components on a tire building machine to build an unvulcanized tire. The unvulcanized tire was vulcanized at 170° C. for 10 minutes to prepare a test tire (size: 195/65R15, a cold weather tire for passenger vehicles).

[Evaluation]

The test tires prepared as above were evaluated as described below. Table 1 shows the results.
<Abrasion Resistance>

Each set of the test tires was mounted on a front-engine, front-wheel-drive car of 2,000 cc displacement made in Japan. After running 5,000 km at 100 to 150 km/h, the groove depth in the tire tread part was measured. The distance at which the tire groove depth decreased by 1 mm was calculated and expressed as an index using the equation below. A higher index indicates better abrasion resistance.

(Abrasion resistance index)=(Distance at which groove depth of each example decreased by 1 mm)/(Distance at which groove depth of tire of Comparative Example 1 decreased by 1 mm)×100

<Grip Performance Under Low Temperature and High Speed Conditions>

Each set of the test tires was mounted on a front-engine, front-wheel-drive car of 2,000 cc displacement made in Japan. The car was run on a snow- and ice-free road at 0 to 3° C. at the Asahikawa Tire Proving Ground in Hokkaido, Japan. The distance (stopping distance) required for the car to stop after the brakes that lock up were applied at 160 km/h was measured. The results are expressed as an index using the equation below, with Comparative Example 1 set equal to 100. A higher index indicates better braking performance at low temperatures.

(Index of grip performance under low temperature and high speed conditions)=(Stopping distance of Comparative Example 1)/(Stopping distance of each formulation example)×100

<Grip Performance Under High Temperature and High Speed Conditions>

The same test procedure was followed as in the evaluation of grip performance under low temperature and high speed conditions, except that the road temperature was 45° C. The results are expressed as an index using the equation below. A higher index indicates better braking performance at high temperatures.

(Index of grip performance under high temperature and high speed conditions)=(Stopping distance of Comparative Example 1)/(Stopping distance of each formulation example)×100

<Wet Grip Performance at Low Temperatures>

The same test procedure was followed as in the evaluation of grip performance under low temperature and high speed conditions, except that the car was run on a wet road. The results are expressed as an index using the equation below. A higher index indicates better wet grip performance at low temperatures.

(Index of wet grip performance at low temperatures)= (Stopping distance of Comparative Example 1)/(Stopping distance of each formulation example)×100

TABLE 1

Cap tread rubber composition

| | | | Example | | | Comparative Example | | | |
|---|---|---|---|---|---|---|---|---|---|
| | | | 1 | 2 | 3 | 1 | 2 | 3 | 4 |
| Formulation (parts by mass) | Base kneading | NR | 8 | 5 | 3 | | 8 | 20 | 8 |
| | | BR | 22 | 25 | | 30 | 22 | 10 | 22 |
| | | Modified SBR | 70 | 70 | 97 | 70 | 70 | 70 | 70 |
| | | Silica 1 (N$_2$SA: 240) | 80 | 130 | 100 | 80 | 100 | 80 | 80 |
| | | Silica 2 (N$_2$SA: 200) | 50 | | 60 | 50 | | 50 | 50 |
| | | Silane coupling agent | 8 | 10 | 12 | 8 | 6 | 8 | 8 |
| | | Carbon black | 5 | 5 | 5 | 5 | 5 | 5 | 5 |
| | | Oil | 10 | 5 | | 10 | 10 | 10 | 10 |
| | | Resin (C5/C9) | 50 | 70 | 90 | 50 | 50 | 50 | 20 |
| | | Stearic acid | 0.5 | 0.5 | 0.5 | 0.5 | 0.5 | 0.5 | 0.5 |
| | | Vulcanization accelerator 1 | 1.5 | 1.5 | 1.5 | 1.5 | 1.5 | 1.5 | 1.5 |
| | | Antioxidant | 2 | 2 | 2 | 2 | 2 | 2 | 2 |
| | | Zinc oxide | 1 | 1 | 1 | 1 | 1 | 1 | 1 |
| | Final kneading | Sulfur | 2 | 2 | 2 | 2 | 2 | 2 | 2 |
| | | Stearic acid | 1 | 1 | 1 | 1 | 1 | 1 | 1 |
| | | Vulcanization accelerator 1 | 0.5 | 0.5 | 0.5 | 0.5 | 0.5 | 0.5 | 0.5 |
| | | Vulcanization accelerator 2 | 2.5 | 2.5 | 2.5 | 2.5 | 2.5 | 2.5 | 2.5 |
| Performance | | Abrasion resistance index | 105 | 117 | 134 | 100 | 96 | 95 | — |
| | | Index of grip performance under low temperature and high speed conditions | 108 | 120 | 125 | 100 | 97 | 98 | — |
| | | Index of grip performance under high temperature and high speed conditions | 102 | 122 | 127 | 100 | 96 | 97 | — |
| | | Index of wet grip performance at low temperatures | 107 | 128 | 135 | 100 | 93 | 103 | — |

TABLE 2

Base tread rubber composition

| | | | Formulation Example |
|---|---|---|---|
| Formulation (parts by mass) | Base kneading | NR | 40 |
| | | BR | 15 |
| | | Modified SBR | 45 |
| | | Silica 3 (N$_2$SA: 175) | 5 |
| | | Carbon black | 40 |
| | | Oil | 30 |
| | | Wax | 1.5 |
| | | Stearic acid | 2 |
| | | Antioxidant | 2 |
| | | Zinc oxide | 3 |
| | Final kneading | Sulfur | 2.5 |
| | | Vulcanization accelerator 2 | 2 |

The results in Tables 1 and 2 show that the tires were very excellent in grip performance (on low temperature and high temperature roads) and abrasion resistance during high speed running in the examples using cap tread rubber compositions which contained SBR and/or BR, an isoprene-based rubber, a filler, and a plasticizer, and in which, as defined in the present invention, the rubber component had a predetermined combined content of SBR and BR and a predetermined isoprene-based rubber content, the filler had a predetermined silica content, and the silica and the plasticizer were present in predetermined amounts relative to the rubber component. Further, the tires exhibited good wet grip performance.

In contrast, the tires of Comparative Examples 1 and 3 containing no isoprene-based rubber or a large amount of an isoprene-based rubber (a small amount of SBR and/or BR) and the tire of Comparative Example 2 containing a small amount of silica exhibited a poor performance balance between grip performance and abrasion resistance and poor wet grip performance. Moreover, Comparative Example 4 containing a small amount of a plasticizer was difficult to knead and form due to its poor processability, and thus could not be evaluated. These results demonstrated that a very excellent performance balance can be achieved only in cases where specific components according to the present invention are incorporated in predetermined amounts as defined in the present invention.

The invention claimed is:

1. A pneumatic tire, comprising a cap tread and a base tread,
   the cap tread being formed from a cap tread rubber composition which comprises:
   at least one of styrene butadiene rubber or polybutadiene rubber;
   an isoprene-based rubber;
   a filler; and
   a plasticizer,
   the rubber composition comprising, based on 100% by mass of a rubber component therein, at least 90% by mass in total of the at least one of styrene butadiene rubber or polybutadiene rubber and 0.3% to 8% by mass of the isoprene-based rubber,
   the filler including, based on 100% by mass thereof, at least 80% by mass of silica,
   the rubber composition comprising, per 100 parts by mass of the rubber component, at least 110 parts by mass of the silica and at least 50 parts by mass of the plasticizer.

2. The pneumatic tire according to claim 1, wherein the styrene butadiene rubber has a vinyl content of 70 mol % or less.

3. The pneumatic tire according to claim 1, wherein the styrene butadiene rubber is a modified styrene butadiene rubber containing a functional group interactive with silica.

4. The pneumatic tire according to claim 1, wherein the styrene butadiene rubber is present in an amount of 80% by mass or more based on 100% by mass of the rubber component.

5. The pneumatic tire according to claim 1, wherein the plasticizer includes, based on 100% by mass thereof, not more than 20% by mass of a liquid plasticizer.

6. The pneumatic tire according to claim 1, wherein the rubber composition comprises a silica having a nitrogen adsorption specific surface area of 190 m$^2$/g or more in an amount of 50 parts by mass or more per 100 parts by mass of the rubber component.

7. The pneumatic tire according to claim 1, wherein the base tread is formed from a base tread rubber composition comprising, based on 100% by mass of a rubber component therein, at least 20% by mass of an isoprene-based rubber.

8. The pneumatic tire according to claim 1, wherein the rubber composition comprises, per 100 parts by mass of the rubber component, at least 130 parts by mass of the silica.

* * * * *